(12) United States Patent
Powell et al.

(10) Patent No.: US 9,798,064 B2
(45) Date of Patent: *Oct. 24, 2017

(54) HYBRID CONCENTRATOR FOR A BACKLIGHT

(71) Applicant: Microsoft Technology Licensing, LLC, Redmond, WA (US)

(72) Inventors: Karlton D. Powell, Lake Stevens, WA (US); Timothy Andrew Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,470

(22) Filed: Mar. 30, 2016

(65) Prior Publication Data

US 2016/0209574 A1    Jul. 21, 2016

Related U.S. Application Data

(63) Continuation of application No. 13/923,889, filed on Jun. 21, 2013, now Pat. No. 9,316,778.

(51) Int. Cl.
*F21V 8/00* (2006.01)

(52) U.S. Cl.
CPC .......... *G02B 6/0031* (2013.01); *G02B 6/003* (2013.01)

(58) Field of Classification Search
CPC ............................. G02B 6/003; G02B 6/0031
See application file for complete search history.

(56) References Cited

U.S. PATENT DOCUMENTS

| 6,079,844 | A | 6/2000 | Whitehead et al. |
|---|---|---|---|
| 7,072,096 | B2 | 7/2006 | Holman et al. |
| 9,316,778 | B2 * | 4/2016 | Powell .................. G02B 6/003 |
| 2005/0185416 | A1 | 8/2005 | Lee et al. |
| 2009/0167651 | A1 | 7/2009 | Minano et al. |
| 2011/0134659 | A1 | 6/2011 | Aastuen et al. |
| 2012/0127401 | A1 | 5/2012 | Biernath |

(Continued)

FOREIGN PATENT DOCUMENTS

| JP | 2009205969 | 9/2009 |
|---|---|---|
| JP | 2010205606 | 9/2010 |
| JP | 2011133416 | 7/2011 |

OTHER PUBLICATIONS

"International Preliminary Report on Patentability", Application No. PCT/US2014/043062, Oct. 1, 2015, 14 Pages.

(Continued)

*Primary Examiner* — Mary Ellen Bowman (57) ABSTRACT

This document describes techniques and apparatuses for implementing a hybrid concentrator for a backlight. The backlight includes a light guide and multiple light sources positioned along an input end of the light guide. The backlight further includes multiple hybrid concentrators that each include a lens in a central region of the concentrator and one or more total-internal-reflection (TIR) zones. Each hybrid concentrator is positioned between a corresponding light source and the light guide, and is configured to concentrate light into the light guide. The light guide then projects the concentrated light to illuminate a modulating display panel to form images for viewing.

19 Claims, 8 Drawing Sheets

(56) References Cited

U.S. PATENT DOCUMENTS

2013/0028558 A1    1/2013  Jenkins
2014/0376260 A1   12/2014  Powell et al.

OTHER PUBLICATIONS

"Non-Final Office Action", U.S. Appl. No. 13/923,889, filed Sep. 2, 2015, 4 pages.
"Second Written Opinion", Application No. PCT/US2014/043062, May 6, 2015, 6 Pages.
"Notice of Allowance", U.S. Appl. No. 13/923,889, filed Dec. 21, 2015, 7 pages.
"International Search Report and Written Opinion", Application No. PCT/US2014/043062, Sep. 24, 2014, 9 Pages.
Benitez,"High Performance Fresnel-based Photovoltaic Concentrator", In the Optics Express, vol. 18, No. S1, Apr. 26, 2010, pp. A25-A40.
Chien,"An Integrated LED Reflector for Backlight System", In Eighth International Conference on Solid State Lighting (SPIE), vol. 7058, Sep. 2, 2008, 8 pages.
Travis,"Collimated Light from a Waveguide for a Display Backlight", Optics Express, vol. 17, Issue 22, (2009), Available at <http://download.microsoft.com/download/D/2/E/D2E425F8-CF3C-4C71-A4A2-70F9D4081007/OpticsExpressbacklightpaper.pdf>, Oct. 2009, pp. 19714-19719.

\* cited by examiner

Without Tilted Refractive Sidewalls

502

506

With Tilted Refractive Sidewalls

504

2-Zone
(Central Region + 1 TIR Zone)

508

3-Zone
(Central Region + 2 TIR Zones)

```
┌─────────────────────────────────────────┐
│ Control light sources to inject light   │
│ into a light guide via a plurality of   │
│ hybrid concentrators                    │
│ 702                                     │
└─────────────────────────────────────────┘
                    │
                    ▼
┌─────────────────────────────────────────┐
│ Control a display panel positioned      │
│ between a viewer and the light guide to │
│ use light received from the light guide │
│ to project images for viewing to the    │
│ viewer                                  │
│ 704                                     │
└─────────────────────────────────────────┘
```

HYBRID CONCENTRATOR FOR A BACKLIGHT

RELATED APPLICATIONS

This application is a continuation of and claims priority to U.S. patent application Ser. No. 13/923,889, filed Jun. 21, 2013, entitled "Hybrid Concentrator for a Backlight," the disclosure of which is contained herein in its entirety by reference.

BACKGROUND

Conventional backlights for displays emit light into a near-hemispherical solid angle, directing light into both low as well as high exit angles. For display devices being viewed by a single user, light exiting at high angles is simply not utilized. This results in both optical power and electrical power being wasted.

SUMMARY

This document describes techniques and apparatuses for implementing a hybrid concentrator for a backlight. The backlight includes a light guide and multiple light sources positioned along an input end of the light guide. The backlight further includes multiple hybrid concentrators that each include a lens in a central region of the concentrator and one or more total-internal-reflection (TIR) zones. Each hybrid concentrator is positioned between a corresponding light source and the light guide, and is configured to concentrate light into the light guide. The light guide then projects the concentrated light to illuminate a modulating display panel to form images for viewing.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a hybrid concentrator for a backlight are described with reference to the following drawings. The same numbers are used throughout the drawings to reference like features and components.

DETAILED DESCRIPTION

Overview

Conventional light guide plate-based (LGP) backlights use light sources that are placed along one or more straight edges, in order to couple the light from the light sources into the light guide. In these cases, near-Lambertian input light is refracted into the light guide by the straight edges, thus not further limiting the etendue. Conventionally, concentrators are not used with backlight units (BLUs) because concentrators are used to limit angular subtend of illumination light in many applications. As described herein, however, a 1-dimensional form of concentrator may be used to couple light into a light guide, such that light angular subtend is limited within a controlled angular width and spread.

This document describes techniques and apparatuses for implementing a hybrid concentrator for a backlight. The backlight includes a light guide and multiple light sources positioned along an input end of the light guide. The backlight further includes multiple hybrid concentrators that each include a lens in a central region of the concentrator and one or more total-internal-reflection (TIR) zones. Each hybrid concentrator is positioned between a corresponding light source and the light guide, and is configured to concentrate light into the light guide. The light guide then projects the concentrated light to illuminate a modulating display panel to form images for viewing.

As described in more detail below, the lens in the central region of each hybrid concentrator provides optical power to low-angle light that is not present in conventional concentrators, while the TIR zones refract and reflect high-angle light to provide greater control over high-angle light than conventional concentrators. Thus, the hybrid concentrator enables a higher level of concentration of light into the light guide, in a shorter optical path or length, than conventional concentrators.

Example Environment

Figure 1:
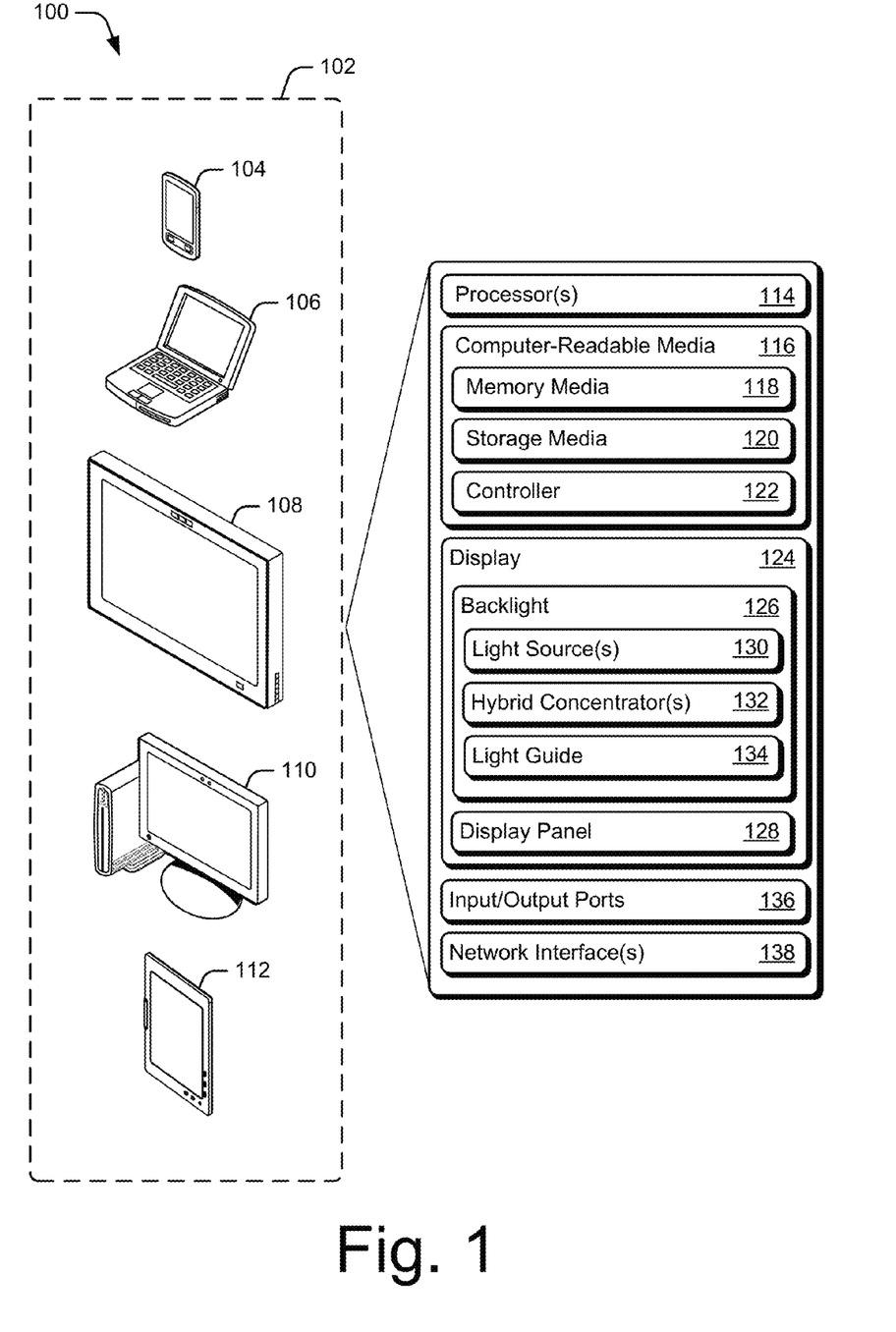
FIG. 1 illustrates an example environment in which a hybrid concentrator for a backlight can be implemented.

FIG. 1 is an illustration of an example environment 100 in which a hybrid concentrator for a backlight can be implemented. Environment 100 can be implemented in a display device 102, which is illustrated, by way of example and not limitation, as one of a smart phone 104, laptop computer 106, television device 108, desktop computer 110, or tablet computer 112.

Display device 102 includes processor(s) 114 and computer-readable media 116, which includes memory media 118 and storage media 120. Applications and/or an operating system (not shown) embodied as computer-readable instructions on computer-readable media 116 can be executed by processor(s) 114 to provide some or all of the functionalities described herein. Computer-readable media also includes a controller 122. How controller 122 is implemented and used varies, and is described in further detail below.

Display device 102 also includes a display 124 that includes a backlight 126 that is configured to illuminate a display panel 128. As will be described in more detail below, backlight 126 includes light source(s) 130, hybrid concentrator(s) 132, and a light guide 134. Note that additional optical sheets may be included, on either back or front sides of light guide 134, in order to reflect and/or redirect high angle light from light guide 134 toward viewing solid angle. Further, optical diffuser sheets may be included in order to provide energy fill within the said viewing solid angle. Further, polarization splitting optical sheets may be included in order to include efficiency improvement in the utilization of light for input into a display panel 128. Display panel 128 may be configured as a polarized liquid crystal display (LCD) panel, such as linearly polarized LCD. Display panel 128, however, can be any suitable structure such as an LCD panel composed of an array of pixels or sub-pixels capable of light modulation and/or manipulation. Display 124 can be implemented to generate two-dimensional (2D) content to a viewer by displaying a same image to each pupil of the viewer, or three-dimensional (3D) content to the viewer by displaying different images to each pupil. Display 124 may be separate or integral with display device 102; integral examples include smart phone 104, laptop computer 106, television device 108, and tablet computer 112; separate examples desktop computer 110 (e.g., when embodied as a separate tower and monitor as shown).

Light sources 130 may include any suitable type or number of light sources, such as by way of example and not limitation, light-emitting-diodes (LEDs), lasers, compact cylindrical fluorescent light sources (CCFL), or any other type of light source configured for use in a display device. In some embodiments, light sources 130 can be implemented as one or more lasers, such as a red laser, green laser, and blue laser. The red, green, and blue lasers may be semiconductor lasers, such as low-power diode lasers, or any other suitable lasers. In some cases, lasers exhibiting near-single mode performance may not fully benefit from the use of hybrid concentrators as such lasers already have limited etendue. However, some multimode lasers exhibiting large etendue may benefit from such use. The red, green, and blue lasers can be independently biased and modulated by controller 122. In some cases, backlight 126 utilizes a plurality of light sources 130 illuminated together, rather than a single light source, because light guide 134 is non-imaging.

Display device 102 may also include Input/Output (I/O) ports 136 that enable interaction with other devices, media, or users. I/O ports 136 can include a variety of ports, such as high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. In at least some instances, 2D or 3D content is received by display device 102 via one or more I/O ports 136 from another device or source (e.g., a set-top box or content receiving device).

Display device 102 may also include network interface(s) 138 for communicating data over wired, wireless, or optical networks. Data communicated over such networks may include 2D or 3D content that can be displayed or interacted with via display 124. By way of example and not limitation, network interface 138 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 2:
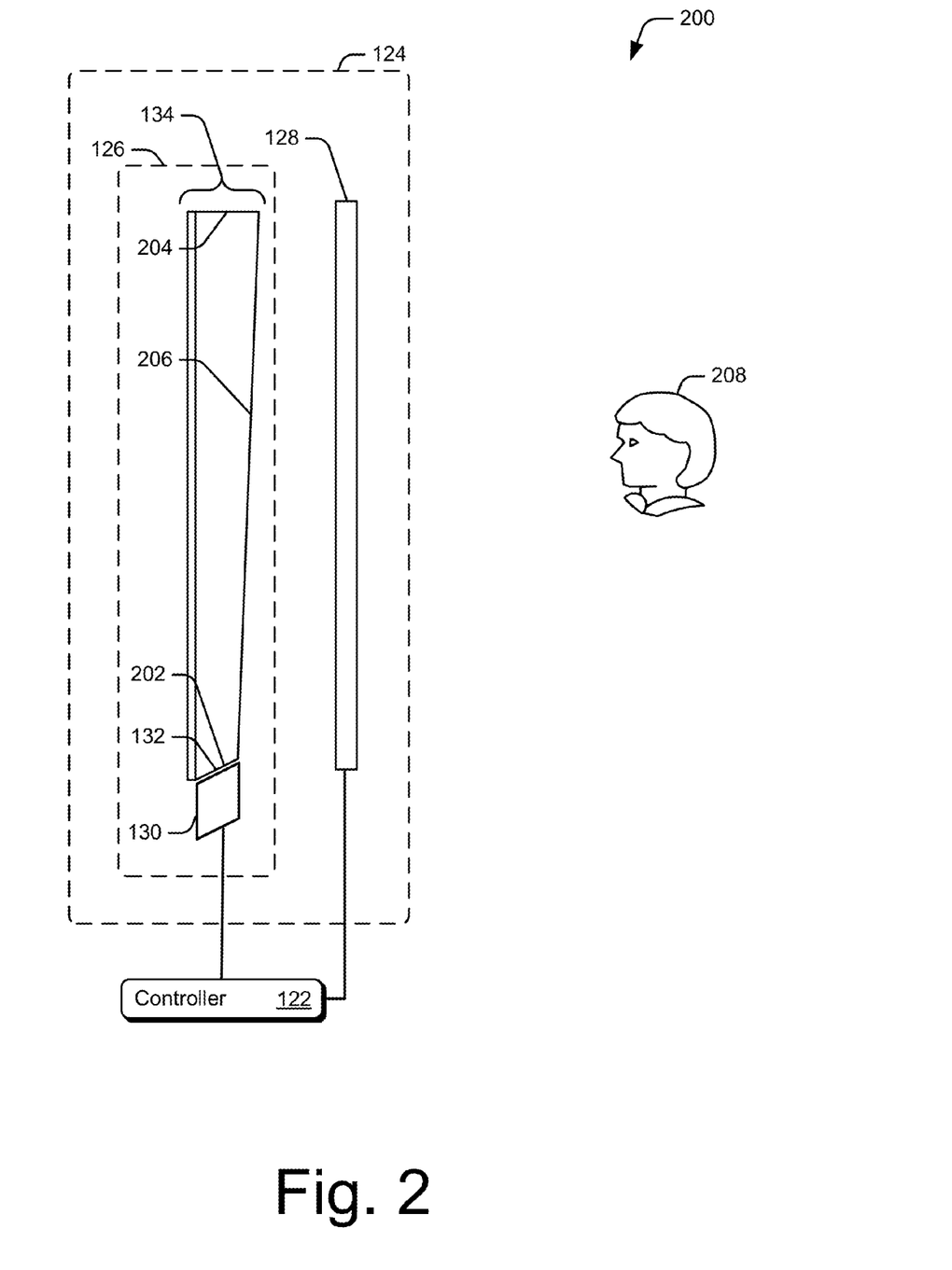
FIG. 2 illustrates a detailed example of the display of FIG. 1.

FIG. 2 illustrates a detailed example 200 of display 124 of FIG. 1. Display 124 may be configured as a non-projection based flat panel display having a depth or thickness similar to that of a liquid crystal display (LCD) panel and the like. In this example, display 124 includes backlight 126 and display panel 128. Backlight 126 includes light sources 130, hybrid concentrators 132, and light guide 134. In some cases, additional optical sheets may be included, on either back or front sides of light guide 134, in order to reflect and/or redirect high angle light from light guide 134 toward viewing solid angle. Further, optical diffuser sheets may be included in order to provide energy fill within the said viewing solid angle. In addition, polarization splitting optical sheets may be included in order to include efficiency improvement in the utilization of light for input into a display panel 128 when configured as a polarized LCD panel. Light guide 134 can be implemented as an optical lens or polyhedral waveguide that transmits light by total internal reflection. In some embodiments, light guide 134 can be implemented as an optical wedge, with a thin end and a thick end. Light guide 134 may also be implemented as a thin film-type light guide, or a plate such as a light guide plate (LGP) having TIR sidewall lateral edges and having extraction features such as sparsely spaced prism features or lenslet dimples and/or bumps. Light guide 134 may also be implemented as a wedge having a nonlinear taper that may be used to extract light from the light guide without the need for a double pass of the light. In this example, light guide 134 is implemented as a "cylinder" type wedge light guide which utilizes hybrid concentrator 132 to enable use of standard white LEDs.

Controller 122 is configured to control light sources 130 to inject light into light guide 134 at an input end 202 of light guide 134. As described in more detail below, hybrid concentrators 132, positioned between light sources 130 and input end 202 of light guide 134, are configured to concentrate light from each light source 130 into light guide 134.

The concentrated light from hybrid concentrators 132 propagates through light guide 134 and is retained within the light guide by total internal reflection (TIR). The concentrated light then reflects off of a reflector at a reflective end 204 of light guide 134. The reflector can be implemented as any type of reflective surface, such as a linear reflector, a reflective cladding, or an angled mirror, and is configured to change an angle of the internally reflected light. The reflector reflects the light towards an exit face 206 of light guide 134 at or above the critical angle of reflection, causing the light to exit light guide 134 at exit face 206 to illuminate display panel 128, which forms images for a viewer 208. The input angle within light guide 134 near the source end substantially corresponds to an exit position at the exit face of light guide 134.

While light guide 134 is illustrated as including a reflective end 204, alternately, light guide 134 be implemented without a reflective end 204. For example, light guide 134 may be implemented with different extraction features, such as sparsely spaced prism features or lenslet dimples and/or bumps. In addition, light guide 134 may be implemented as a wedge having a nonlinear taper that may be used to extract light from the light guide without reflecting off of a reflective end.

Figure 3:
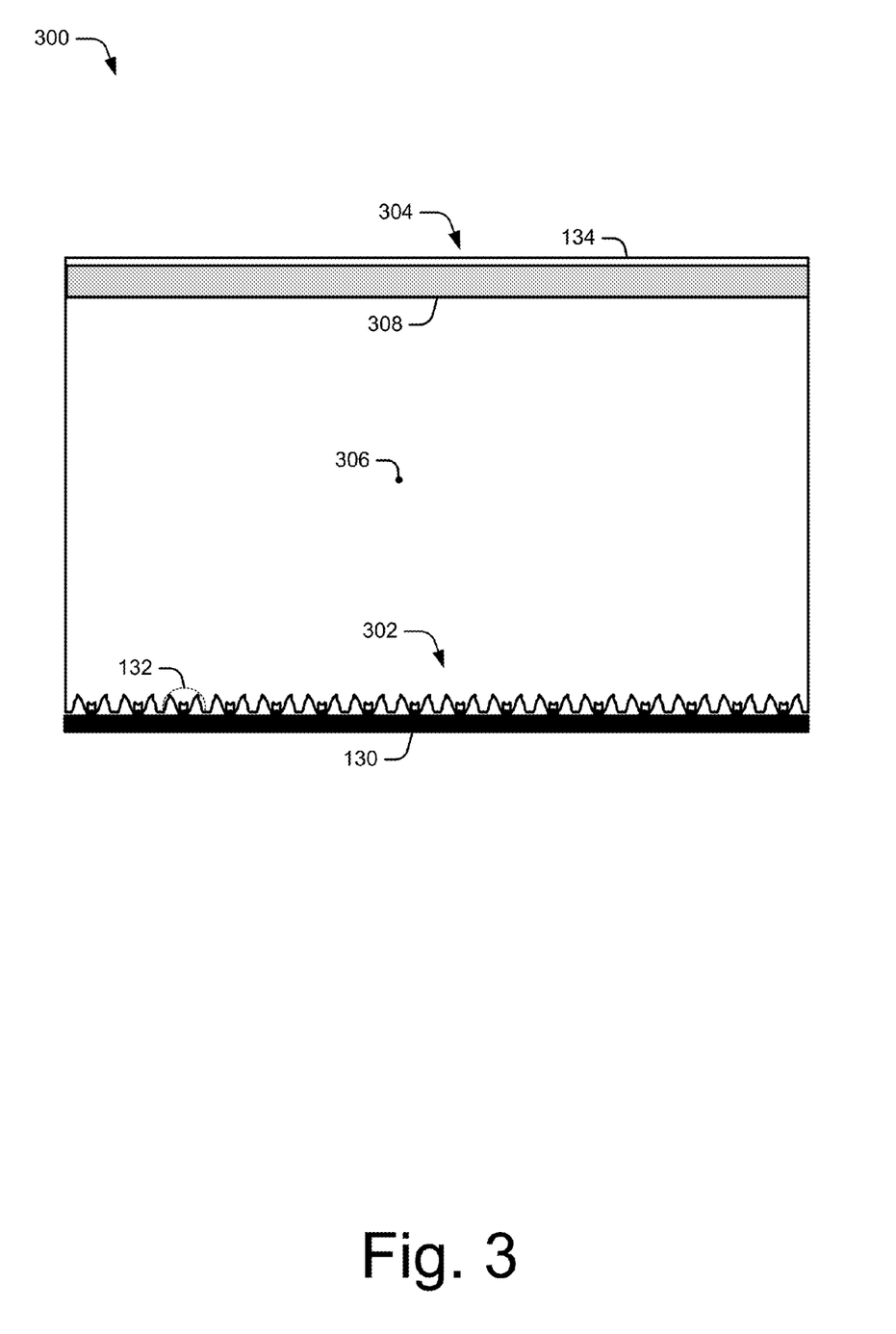
FIG. 3 illustrates a detailed example of a top view of a backlight configured with light sources, hybrid concentrators, and a light guide.

FIG. 3 illustrates a top view example 300 of a backlight 126 configured with light sources 130, an array of hybrid concentrators 132, and a light guide 134. Light guide 134 includes an input end 302, a reflective end 304, and an exit face 306, which correspond to input end 202, reflective end 204, and exit face 206, respectively, of FIG. 2. Multiple light sources 130 are positioned along input end 202 of light guide 134. For example, the light sources may be soldered to a flexible PCB strip that is butted up against light guide 134.

Figure 4:
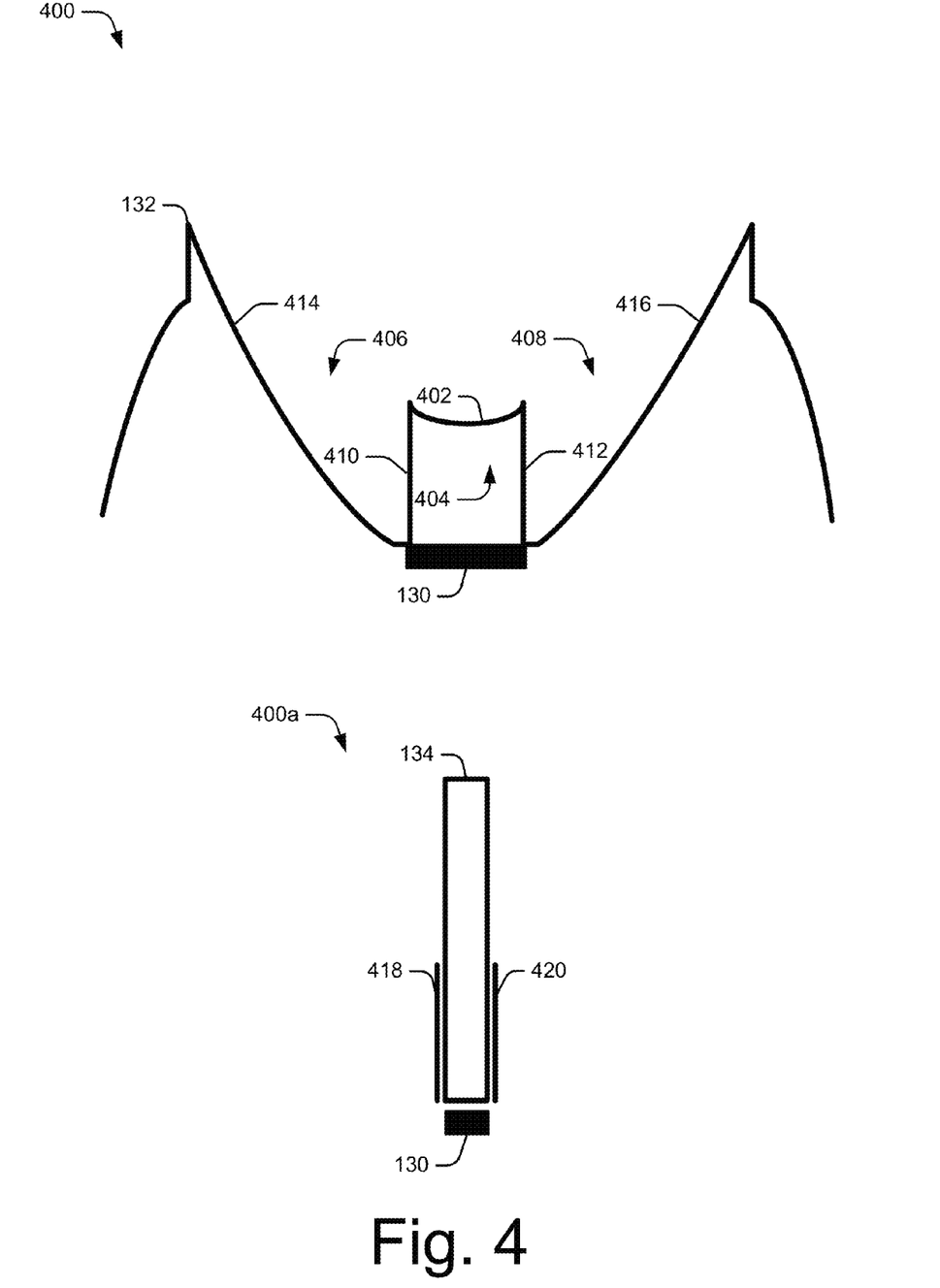
FIG. 4 illustrates a detailed example of a single light source and a single hybrid concentrator of FIG. 3.

A hybrid concentrator, of the array of hybrid concentrators 132, is positioned between each corresponding light source 130 and light guide 134. In this example, a dashed curve is used to show a single hybrid concentrator 132. A close-up illustration of a single hybrid concentrator 132 is illustrated in FIG. 4, below.

Each hybrid concentrator 132 is configured to concentrate light from the corresponding light source 130 into light guide 134. Hybrid concentrators 132 may be cut or directly molded onto input end 302 of light guide 134 (e.g., being a single molded part). Alternately, hybrid concentrators 132 may be manufactured as a separate piece and mounted to input end 302 of light guide 134.

In some embodiments, light from light sources 130 may be coupled into light guide 134 from hybrid concentrators 132 by bounding a top and a bottom of the interface between hybrid concentrators 132 and light guide 134 with reflective strips. In one or more embodiments, the air-media volume between the lensing surface in the central region of a hybrid concentrator and a corresponding light source may be bounded at the top and bottom guide faces, as defined by thickness of light guide 134 near the input edge.

As described above with regards to FIG. 2, controller 122 is configured to control light sources 130 to inject light into light guide 134 at input end 302 of light guide 134. Each hybrid concentrator 132 is configured to concentrate light from the corresponding light source 130 into light guide 134. The concentrated light propagates through light guide 134 and is retained within the light guide by total internal reflection (TIR). The concentrated light then reflects off of a reflector 308 at reflective end 304. Reflector 308 reflects the light towards exit face 306 of light guide 134 at or above the critical angle of reflection, causing the light to exit light guide 134 at exit face 306 to illuminate display panel 128.

FIG. 4 illustrates a detailed example of a single light source 130 and a single hybrid concentrator 132. In accordance with various embodiments, hybrid concentrator 132 includes a lens 402, which may be 1-dimensional in lens profile, in a central region 404 of the concentrator, and one or more total-internal-reflection (TIR) zones, which are illustrated as TIR zones 406 and 408 in this example. Example 400 illustrates a "three-zone" hybrid concentrator because there are three total zones: central region 404, and TIR zones 406 and 408. However, hybrid concentrator 132 can be configured with any combination of zones. In some cases, hybrid concentrator 132 includes a central region, and two TIR zones on each side of the central region. As more TIR zones are utilized in the design of hybrid concentrator 132, angular control of the output angular constraint may be improved. A downside of increasing the angular control, however, is that the addition of multiple TIR zones may increase an overall length of hybrid concentrator 132.

In example 400, central region 404 is bound by two refractive sidewalls 410 and 412. Refractive sidewalls 410 and 412 are substantially perpendicular to the input end of light guide 134. In some cases, however, refractive sidewalls 410 and 412 may be tilted, or angled, to reduce the reflection of light off of the refractive sidewalls. A facetted turning surface, or turning teeth, may also be included on refractive sidewalls 410 and 412 to reduce reflection at that interface, which may also introduce further benefits to shorten the length of hybrid concentrator 132.

Figure 5:
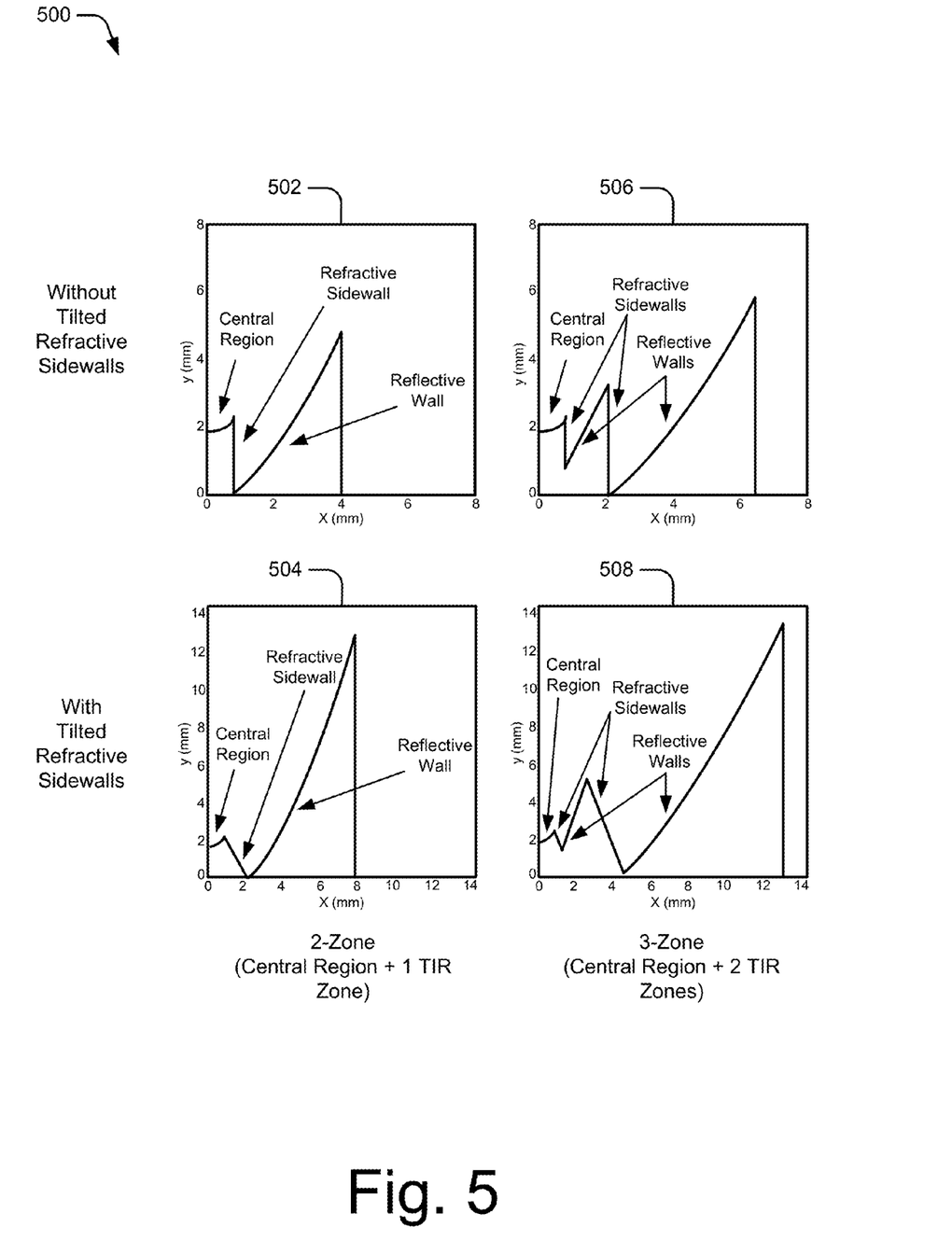
FIG. 5 illustrates a detailed example of various configurations of a hybrid concentrator.

As an example, consider FIG. 5 which illustrates an example 500 of half-profiles of various configurations of hybrid concentrator 132. For example, at 502 a 2-zone hybrid concentrator without tilted sidewalls is illustrated. The hybrid concentrator at 502 is considered to be a "2-zone" hybrid concentrator because it includes a central region, and one TIR zone. Note, however, that FIG. 5 illustrates half-profiles of hybrid concentrators 132. Thus, a full profile of the hybrid concentrator at 502 would include 3 zones: the central region, and one TIR zone on either side of the central region.

At 504 a 2-zone hybrid concentrator with tilted sidewalls is illustrated. Similar to the hybrid concentrator at 502, the hybrid concentrator at 504 is considered to be a "2-zone" hybrid concentrator because it includes a central region, and one TIR zone. Note, however, that FIG. 5 illustrates half-profiles of hybrid concentrators 132. Thus, a full profile of the hybrid concentrator at 504 would include 3 zones: the central region, and one TIR zone on either side of the central region. Unlike the hybrid concentrator at 502, the hybrid concentrator at 504 includes tilted refractive sidewalls.

At 506, a 3-zone hybrid concentrator without tilted sidewalls is illustrated. Similar to the hybrid concentrator at 502, the hybrid concentrator at 506 does not include tilted sidewalls. Unlike the hybrid concentrator at 502, however, the hybrid concentrator at 506 is considered to be a "3-zone" hybrid concentrator because it includes a central region, and two TIR zones. Note, however, that FIG. 5 illustrates half-profiles of hybrid concentrators 132. Thus, a full profile of the hybrid concentrator at 506 would include 5 zones, the central region, and two TIR zones on either side of the central region.

At 508, a 3-zone hybrid concentrator with tilted sidewalls is illustrated. Similar to the hybrid concentrator at 504, the hybrid concentrator at 508 includes tilted sidewalls. Unlike the hybrid concentrator at 504, however, the hybrid concentrator at 508 is considered to be a "3-zone" hybrid concentrator because it includes a central region, and two TIR zones. Note, however, that FIG. 5 illustrates half-profiles of hybrid concentrators 132. Thus, a full profile of the hybrid concentrator at 508 would include 5 zones, the central region, and two TIR zones on either side of the central region.

The hybrid concentrators illustrated in FIG. 5 show the various tradeoffs that are made in the design of hybrid concentrator 132. For example, adding additional TIR zones to hybrid concentrator 132 enables the etendue of the source to be split to improve control of angular spread of exit angle profile. However, adding additional zones causes a slight increase in the length of the hybrid concentrator, as illustrated in FIG. 5.

Tilting refractive sidewalls may reduce the reflection of light off of the surface of the refractive sidewall, as well as cause possible improvement in mold release. However, tilting the refractive sidewalls may result in an even greater increase in the length of the hybrid concentrator.

In some embodiments, hybrid concentrator 132 includes a low refractive index gap in central region 404 between lens 402 and light source 130. The low refractive index gap, for example, can be an air gap. The low refractive index gap provides for light from light source 130 to expand over a shorter optical path which enables pseudo-collimation of the light within the confines of a physically shorter concentrator. In order to maintain guiding of the light injected into hybrid concentrator 132 from light source 130, reflective top and bottom faces may be used to cover the low refractive index gap. As an example, consider example 400a of FIG. 4, which illustrates a side view of light guide 134. In this example, top and bottom reflector strips, 418 and 420, cover the low refractive index gap, bound by the thickness between top and bottom faces of light guide 134. In some cases, anti-wetting surface reliefs may be used to prevent additional losses due to wetting. Note that the reflectivity of these top and bottom surfaces can directly impact luminance mapped to the upper and lower position regions on the exit face of light guide 134, and as such, reflectivity of the reflective sheet, or film, or reflective coated mount can be high to ensure uniform results.

Hybrid concentrator 132 is configured to be compatible with standard LED light sources. A standard LED light source, such as a typical white LED, emits Lambertian light at a wide variety of angles. Lambertian light can be grouped into low-angle light and high-angle light. Low-angle light generally corresponds to light that is emitted at approximately 20 degrees or less, and high-angle light corresponds to light emitted at greater than 20 degrees. It is to be appreciated, however, that this range can vary by +/−10 degrees.

As described above, conventional concentrators transmit low-angle light directly through the exit plane of the concentrator, without providing any optical power to the low-angle light. In accordance with various embodiments, lens 402 is configured to receive low-angle light from light source 130, and to refract the low-angle light into light guide 134.

Figure 6:
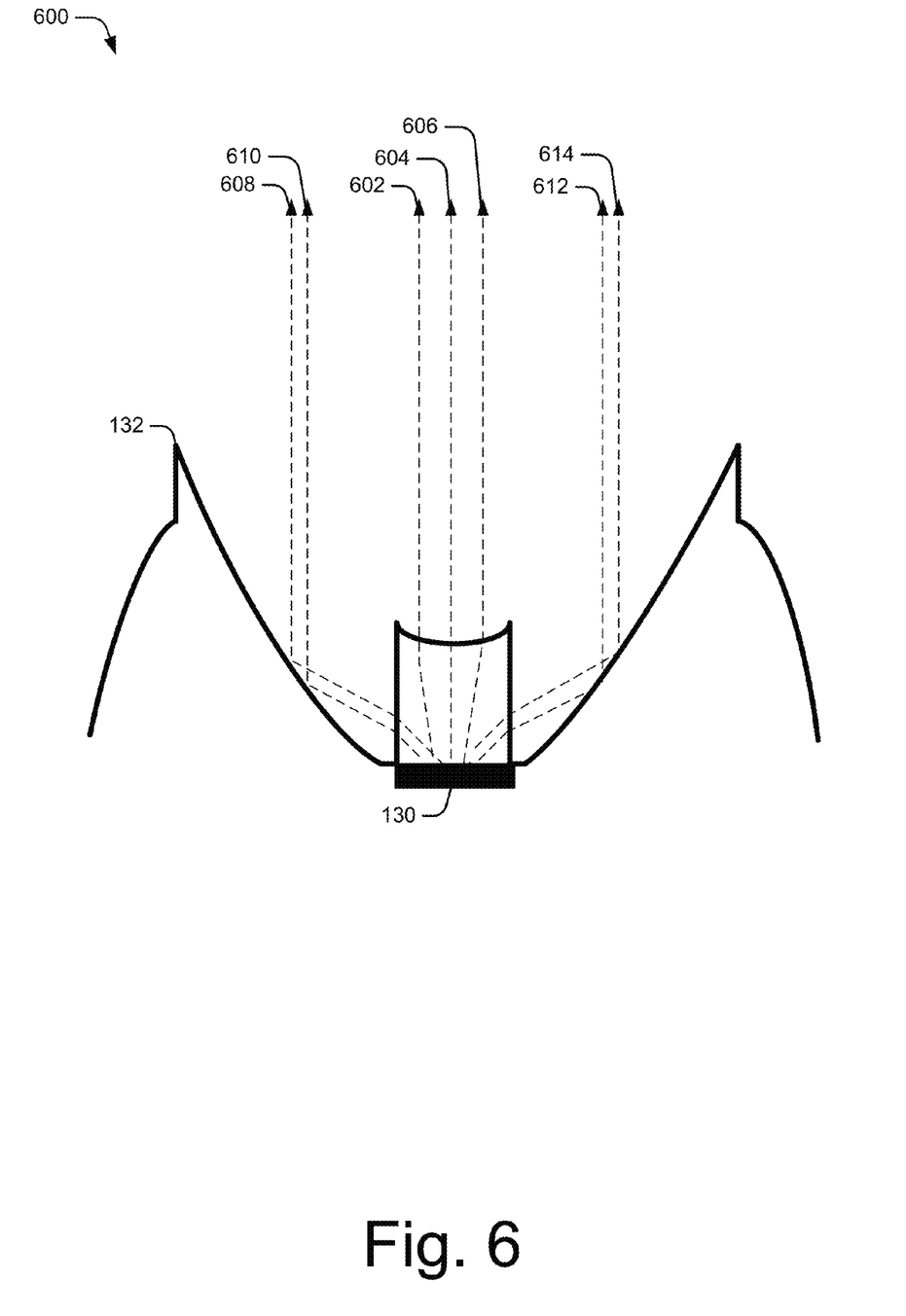
FIG. 6 illustrates a detailed example of light rays from a single light source injected into the single concentrator of FIG. 4.

Consider, for example, FIG. 6, which illustrates an example 600 of light rays from single light source 130 injected into the single hybrid concentrator 132 of FIG. 4. In example 600, light source 130 injects low-angle light rays 602, 604, and 606 into central region 404 of hybrid concentrator 132. The low refractive index gap causes light rays 602, 604, and 606 to expand before making contact with lens 40, which refracts pseudo-collimated light rays 602, 604, and 606 into light guide 134. Note that light rays 602, 604, and 606 do not transmit through refractive sidewalls 410 or 412 because the light rays are low-angle light rays. Further, it is to be appreciated that lens 402 provides optical power to the low-angle light by refracting the low-angle light, thus partially collimating the low-angle light in a manner only limited by the finite extended etendue, or size, of the source. It is to be appreciated that partially collimating the low-angle light causes the low angle light to be pseudo-collimated. Thus, lens 402 improves control of exit angular width of low-angle light, such as light ray 602, 604, and 606.

By forming convergent optical power in central region 404 of the concentrator, at least two advantages over conventional concentrators are achieved. First, the limitation of not being able to control exit angular spread within the central region is improved, as light within central region 404 is pseudo-collimated. Second, the addition of the low refractive index gap in front of lens 402 provides expansion of the light over a shorter optical path enabling pseudo-collimation within the confines of a physically shorter concentrator.

In example 400, TIR zone 406 is bound by refractive sidewall 410 and a reflective wall 414, and TIR zone 408 is bound by refractive sidewall 412 and a reflective wall 416. Refractive sidewalls 410 and 412 are configured to refract high-angle light from a light source 130 into TIR zones 406 and 408, respectively. Reflective walls 414 and 416 are configured to reflect high-angle light from light source 130 that is refracted into TIR zones 406 and 408, and concentrate the high-angle light into light guide 134. Note that reflective walls 414 and 416 may include the form of a conic profile, which may include but it not limited to parabolic.

In FIG. 6, for example, light source 130 injects high-angle light rays 608, 610, 612, and 614 into central region 404 of hybrid concentrator 132. Since these light rays are high-angle light rays (e.g., greater than 20 degrees), the light rays transmit through refractive sidewalls 410 and 412 and are refracted into TIR zones 406 and 408. For example, light rays 608 and 610 are refracted into TIR zone 406, and light rays 612 and 614 are refracted into TIR zone 408. The refracted light rays then contact reflective walls 414 or 416, which reflect the light rays, by total-internal-reflection, into light guide 134. For example, refracted light rays 608 and 610 reflect off of reflective wall 414, which concentrates light rays 608 and 610 into light guide 134. Similarly, refracted light rays 612 and 614 reflect off of reflective wall 416, which concentrates light rays 612 and 614 into light guide 134. Thus, hybrid concentrator 132 is able to redirect or collect the angular distribution of both low-angle light and high-angle light.

As described above, hybrid concentrator 132 achieves a higher level of concentration of light in a significantly shorter optical path, or length, than conventional concentrators. The reduced length of hybrid concentrator 132 is due to the low refractive index gap between light source 130 and lens 402. Further, as described above, hybrid concentrator 132 is able to redirect or collect the angular distribution of both low-angle light and high-angle light. Thus, hybrid concentrator 132 provides highly efficient angular constraint, appropriate for attaining high luminance in a single viewer viewing mode.

Example Method

Figure 7:
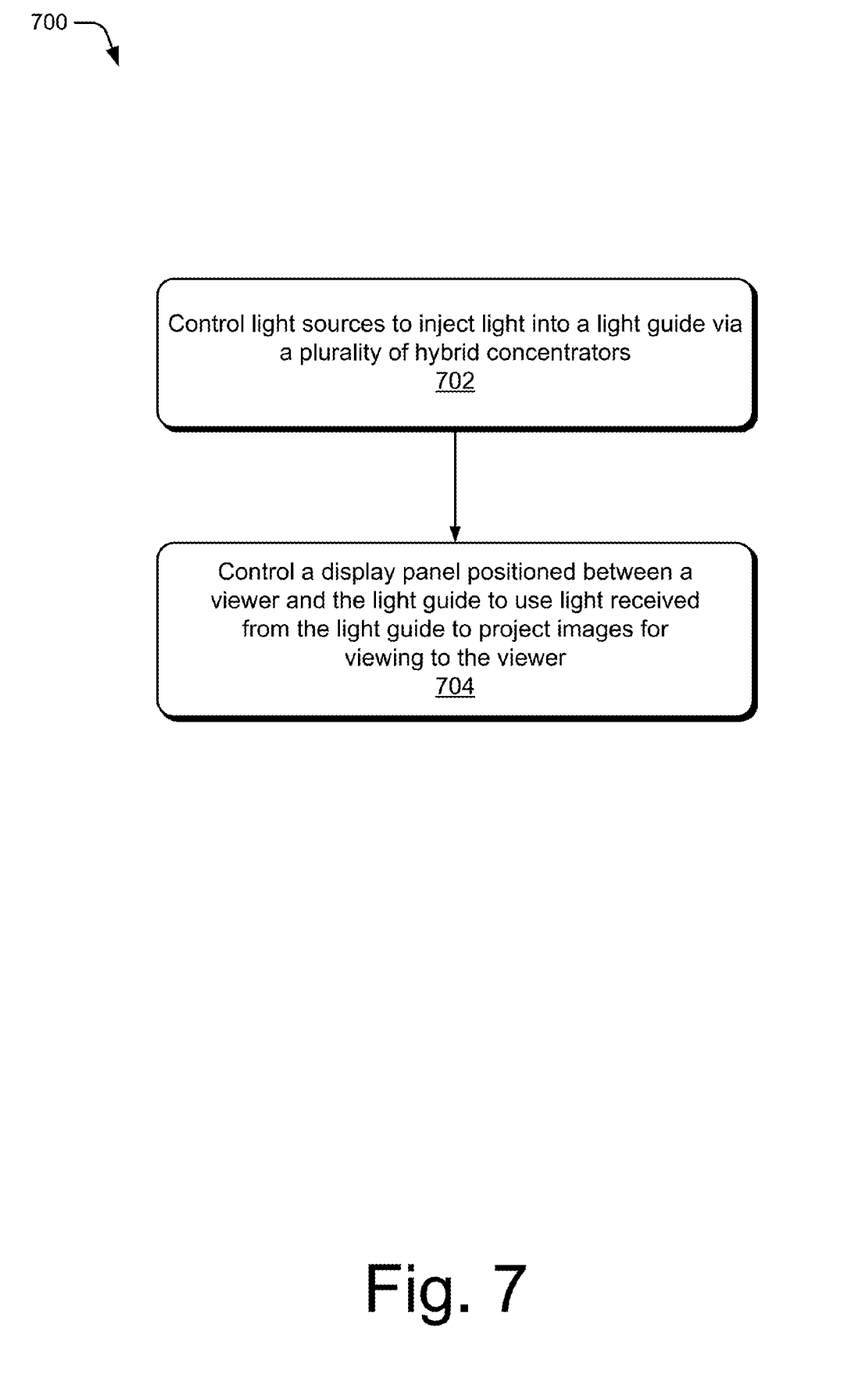
FIG. 7 illustrates a detailed example method for controlling a backlight equipped with hybrid concentrators.

FIG. 7 is flow diagram depicting an example method 700 for controlling a backlight equipped with hybrid concentrators.

Block 702 controls light sources to inject light into a light guide via a plurality of hybrid concentrators. For example, controller 122 (FIG. 1) controls light sources 130 to inject light into light guide 134 via hybrid concentrators 132. As described above, each of the hybrid concentrators is positioned between light guide 134 and a corresponding light source 130 and include a lens in a central region of the concentrator, and one or more TIR zones. In FIG. 4, hybrid concentrator 132 includes lens 402 in central region 404 and TIR zones 406 and 408.

Block 704 controls a display panel positioned between a viewer and the light guide to use light received from the light guide to project images for viewing to the viewer. For example, controller 122 controls display panel 128 to use light received from light guide 134 to project images for viewing to the viewer.

Example Device

Figure 8:
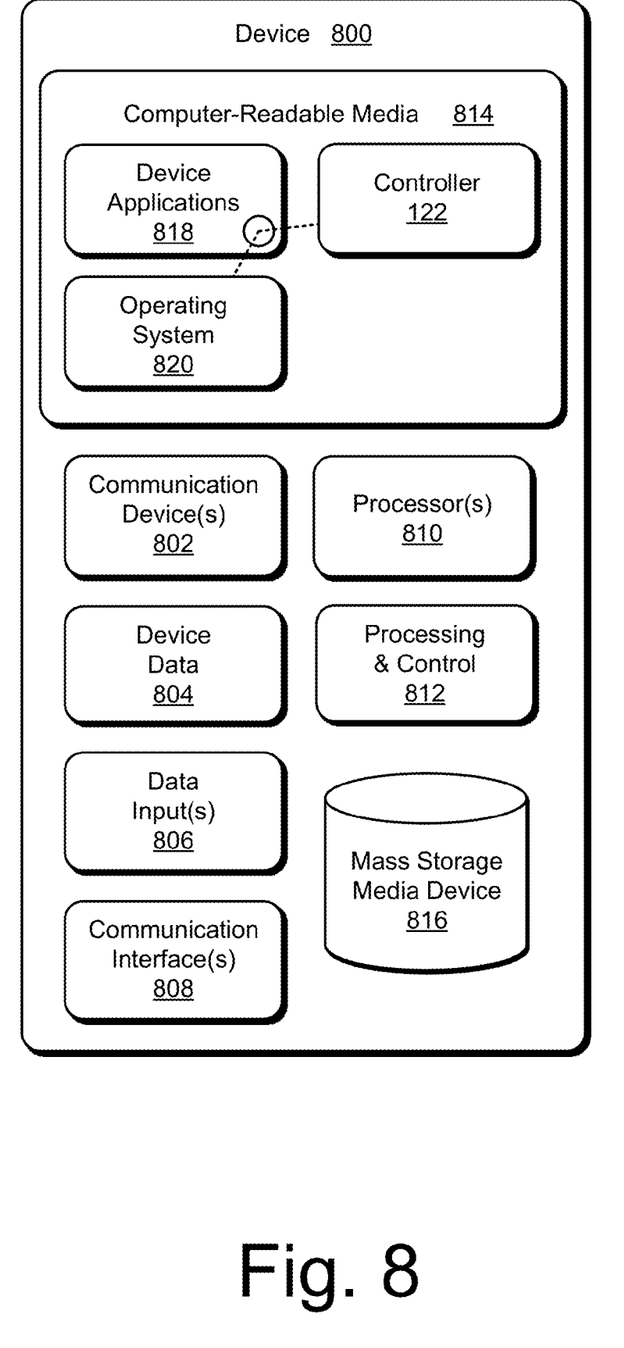
FIG. 8 illustrates an example device in which a hybrid concentrator for a backlight can be implemented.

FIG. 8 illustrates various components of an example device 800 that can be implemented as any type of client, server, and/or display device as described with reference to the previous FIGS. 1-7 to implement techniques enabling a hybrid concentrator for a backlight. In embodiments, device 800 can be implemented as one or a combination of a wired and/or wireless device, a head-mounted display device (e.g., eyeglasses, sunglasses, etc.) as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a viewer (e.g., a person or user) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for implementing a hybrid concentrator for a backlight. Alternatively or in addition, device 800 can be implemented with any one or combination of hardware, firmware, a system-on-chip (SoC), or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (e.g., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components or modules to implement techniques using or enabling a hybrid concentrator for a backlight. In this example, the device applications 818 can include controller 122 for controlling a backlight that includes a hybrid concentrator.

CONCLUSION

This document describes various apparatuses and techniques for implementing a hybrid concentrator for a backlight. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A backlight for a display, the backlight comprising:
a light guide;
a plurality of light sources positioned along an input end of the light guide; and
a plurality of hybrid concentrators, each hybrid concentrator positioned between a corresponding light source and the light guide and configured to concentrate light from the corresponding light source into the light guide, and each hybrid concentrator comprising:
a lens in a central region of the hybrid concentrator, the central region bound by the lens and two refractive sidewalls; and
one or more total-internal-reflection (TIR) zones, each of the one or more TIR zones including a reflective wall configured to reflect high-angle light into the light guide, at least one of the hybrid concentrators including two TIR zones positioned on each side of the central region.

2. The backlight of claim 1, wherein the central region is configured to receive low-angle light from the corresponding light source and refract the low-angle light through the lens into the light guide.

3. The backlight of claim 1, wherein the central region is configured to receive high-angle light from the corresponding light source and refract the high-angle light into one of the TIR zones.

4. The backlight of claim 3, wherein each of the one or more TIR zones is bound by one of the two refractive sidewalls and the reflective wall.

5. The backlight of claim 1, wherein the refractive sidewalls are substantially perpendicular to the input end of the light guide.

6. The backlight of claim 1, wherein the refractive sidewalls are tilted to reduce the reflection of light off of the refractive sidewalls.

7. The backlight of claim 1, wherein the central region includes a low refractive index gap between the corresponding light source and the lens.

8. The backlight of claim 7, further comprising reflective top and bottom layers that cover the low refractive index gap between the corresponding light source and the lens.

9. The backlight of claim 1, wherein at least one of the hybrid concentrators includes one TIR zone positioned on each side of the central region.

10. The backlight of claim 1, wherein the plurality of hybrid concentrators are cut into the input end of the light guide.

11. A display device comprising:
a display comprising:
a modulating display panel;
a backlight configured to illuminate the modulating display panel, the backlight comprising:
a light guide comprising an input end and a reflective end;
a plurality of light sources positioned along the input end of the light guide; and
a plurality of hybrid concentrators, each hybrid concentrator positioned between a corresponding light source and the light guide, and each hybrid concentrator comprising a lens in a central region of the hybrid concentrator and one or more total-internal-reflection (TIR) zones, each of the one or more TIR zones including a reflective wall configured to reflect high-angle light into the light guide, the central region bound by the lens and two refractive sidewalls, each refractive sidewall configured to refract high-angle light from the corresponding light source into one of the TIR zones, wherein at least one of the hybrid concentrators includes two TIR zones positioned on each side of the central region;

a controller configured to control the plurality of light sources to inject light into the light guide via the plurality of concentrators to cause the light guide to illuminate the display panel.

12. The display device of claim 11, wherein the central region is configured to receive low-angle light from the corresponding light source and refract the low-angle light through the lens into the light guide.

13. The display device of claim 11, wherein the central region is configured to receive high-angle light from the corresponding light source and refract the high-angle light into one of the TIR zones.

14. The display device of claim 11, wherein each of the one or more TIR zones is bound by one of the two refractive sidewalls and the reflective wall.

15. A method comprising:

controlling one or more light sources to inject light into a light guide via a plurality of hybrid concentrators, each of the hybrid concentrators positioned between the light guide and a corresponding light source, and each hybrid concentrator including a lens in a central region and one or more total-internal-reflection (TIR) zones, each of the one or more TIR zones including a reflective wall configured to reflect high-angle light into the light guide, the central region bound by the lens and two refractive sidewalls, each refractive sidewall configured to refract high-angle light from the corresponding light source into one of the TIR zones, wherein at least one of the hybrid concentrators includes two TIR zones positioned on each side of the central region; and controlling a display panel positioned between a viewer and the light guide to use light received from the light guide to project images for viewing to the viewer.

16. The method of claim 15, wherein the central region is configured to receive low-angle light from the corresponding light source and refract the low-angle light through the lens into the light guide.

17. The method of claim 15, wherein the central region is configured to receive high-angle light from the corresponding light source and refract the high-angle light into one of the TIR zones.

18. The method of claim 15, wherein each of the one or more TIR zones is bound by one of the two refractive sidewalls and the reflective wall.

19. The backlight of claim 1, wherein each refractive sidewall is configured to refract high-angle light from the corresponding light source into one of the TIR zones.

* * * * *